United States Patent [19]

Schonstedt

[11] Patent Number: 5,138,761
[45] Date of Patent: Aug. 18, 1992

[54] METHOD OF MANUFACTURING MAGNETIC DETECTION APPARATUS

[75] Inventor: Erick O. Schonstedt, Reston, Va.

[73] Assignee: Schonstedt Instrument Company, Reston, Va.

[21] Appl. No.: 709,989

[22] Filed: Jun. 4, 1991

Related U.S. Application Data

[62] Division of Ser. No. 528,414, May 25, 1990, Pat. No. 5,097,211.

[51] Int. Cl.⁵ .............................................. H01F 41/00
[52] U.S. Cl. .................................. 29/602.1; 29/609.1; 324/326; 324/345
[58] Field of Search ................... 29/602.1, 609.1, 594; 324/324–328, 345, 346

[56] References Cited

U.S. PATENT DOCUMENTS

| | | | |
|---|---|---|---|
| 2,468,125 | 4/1949 | Silver | 324/149 X |
| 3,281,660 | 10/1966 | Studenick | 324/345 X |
| 3,643,155 | 2/1972 | Riddle et al. | 324/43 |
| 3,894,283 | 7/1975 | Schonstedt | 324/3 |
| 3,909,704 | 9/1975 | Schonstedt | 324/3 |
| 3,961,245 | 6/1976 | Schonstedt | 324/43 R |
| 4,110,689 | 8/1978 | Schonstedt | 324/254 |
| 4,163,877 | 8/1979 | Schonstedt | 179/146 E |
| 4,406,272 | 9/1983 | Kiess et al. | 123/617 |
| 4,539,522 | 9/1985 | Schonstedt | 324/345 X |
| 4,623,842 | 11/1986 | Bell et al. | 324/245 |

FOREIGN PATENT DOCUMENTS 2135460  8/1984  United Kingdom ............... 324/326

Primary Examiner—Carl E. Hall
Attorney, Agent, or Firm—Shapiro and Shapiro

[57] ABSTRACT

A magnetic detection apparatus (magnetic locator) comprises a housing constituted by a first integral molded plastic unit and a second integral molded plastic unit that are joined. The first unit has a tube with a plate at one end thereof transverse to the length of the tube, the plate having an opening through which a magnetic sensor assembly is inserted into the tube. The second unit has a cover open at one end and having a tubular handle at the opposite end, by which the user may grasp the apparatus. Attachment of the cover to the plate closes the open end of the cover to provide a casing. Magnetic sensors are mounted on a channel or angle structural member that is rigidly attached to the chassis of an electrical unit mounted in the casing. Sound from a loudspeaker mounted on the chassis is transmitted through the handle to the exterior of the apparatus. The chassis also supports a meter that is visible through an opening in an end wall of the cover adjacent to the handle.

3 Claims, 4 Drawing Sheets

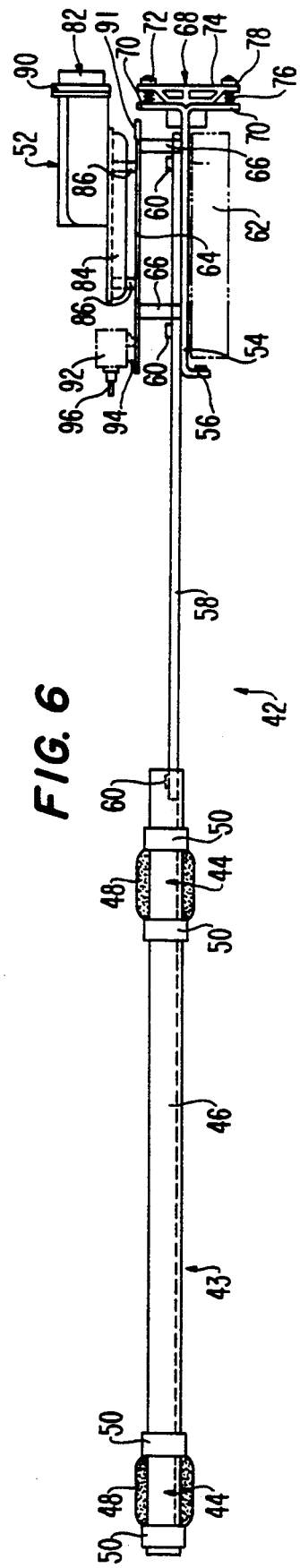
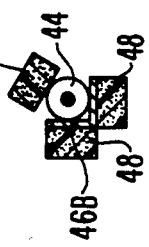

METHOD OF MANUFACTURING MAGNETIC DETECTION APPARATUS

This is a division of application Ser. No. 528,414, filed May 25, 1990, now U.S. Pat. No. 5,097,211.

BACKGROUND OF THE INVENTION

This invention is concerned with magnetic detection apparatus, particularly of the type employing fluxgate sensors for locating magnetic objects.

A magnetic locator presently marketed by the assignee of the present invention is disclosed, for example, in U.S. Pat. Nos. 3,894,283; 3,909,704; 3,961,245; 4,110,689; and 4,163,877 and has been highly successful. As is evident from the foregoing patents, the locator and its method of manufacture are superior in several significant respects compared to the prior art. The present invention provides further significant improvements, as will become apparent hereinafter. The following brief description of the magnetic locator presently marketed will provide a background for those improvements.

The housing of the locator presently marketed is assembled from several separate components including an aluminum tube, an aluminum plate that is attached to one end of the tube, and an aluminum cover that is attached to the plate to form a casing. The user holds the locator by grasping the tube or the casing. A sensor assembly is formed by mounting a pair of magnetic sensors in oppositely directed notches at the ends of an aluminum sensor-support tube. One sensor is pre-assembled with a stiff excitation wire that is passed through the tube and is then assembled with the other sensor. Signal leads from the sensors extend along the exterior of the sensor-support tube. Thick foam pads are taped to the exterior of the sensor-support tube, and then the sensor assembly is inserted in the tube of the housing. The excitation wire is then soldered to a printed circuit board mounted on a chassis of an electrical unit that is mounted on the plate of the housing. By virtue of the excitation wire and the foam pads, the position of the sensor assembly relative to the electrical unit is established, but to prevent the possibility of any relative movement that is likely to produce a measurement error, a U-shaped bail has its ends bent into notches in the sensor-support tube and its bight attached to the chassis by a screw. An ON/OFF sensitivity control is also mounted on the plate of the housing and is connected to the printed circuit board by flexible leads.

BRIEF DESCRIPTION OF THE PRESENT INVENTION

The present invention improves upon the abovedescribed magnetic detection apparatus in several respects. The housing of the invention is constituted by two molded plastic units, one of which is a tube having a plate at one end, and the other of which is a cover with an open end that is closed by the plate to form a casing, and that has a tubular handle extending from its opposite end. The plastic housing is less expensive to manufacture and requires fewer assembly steps.

The magnetic sensor assembly of the invention comprises a sensor support that is a channel or angle structural member entirely open at one side, so that the magnetic sensors may be preassembled with the excitation wire and then placed on the sensor support via the open side. The sensors are then adhesively attached to the support. A rigid strip attaches the support to the chassis of the electrical unit, so that the position of the sensor assembly relative to the chassis is fixed and so that the sensor assembly and the electrical unit form a unitary structure for assembly with the housing. For this purpose, the sensor assembly is inserted into the tube of the housing at the same time that the chassis is juxtaposed with the plate of the housing.

The ON/OFF sensitivity control is rigidly mounted on the printed circuit board and has a shaft that extends through an opening in the housing plate when the chassis is juxtaposed with the plate. The tubular handle of the housing facilitates grasping of the locator by the user and also serves to transmit an acoustic indication from the interior of the casing to the user. The locator of the invention also includes a meter that is visible through an end wall of the casing adjacent to the handle.

BRIEF DESCRIPTION OF THE DRAWINGS

The invention will be further described in conjunction with the accompanying drawings, which illustrate preferred (best mode) embodiments, and wherein:

FIG. 6 is a side elevation view of a magnetic sensor assembly and electrical unit contained within the housing of FIGS. 1-5;

FIGS. 7 and 8 are transverse sectional views showing alternative supports for the sensors; and FIG. 9 is a fragmentary longitudinal vertical sectional view showing a meter at a portion of the second housing unit shown in FIG. 3.

DETAILED DESCRIPTION OF PREFERRED EMBODIMENTS

Figure 1:
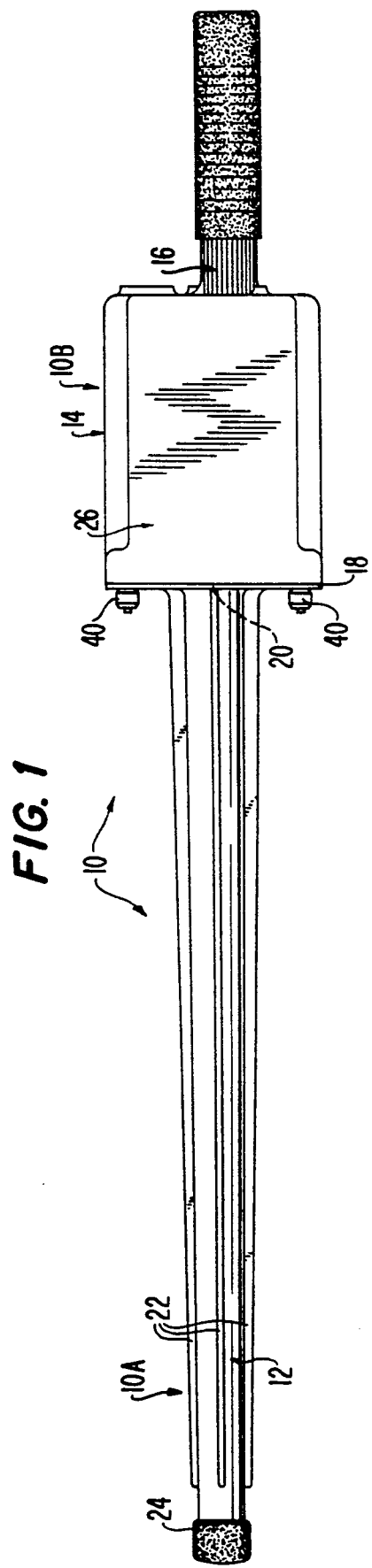
FIG. 1 is a side elevation view of magnetic detection apparatus in accordance with the invention.
Figure 2:
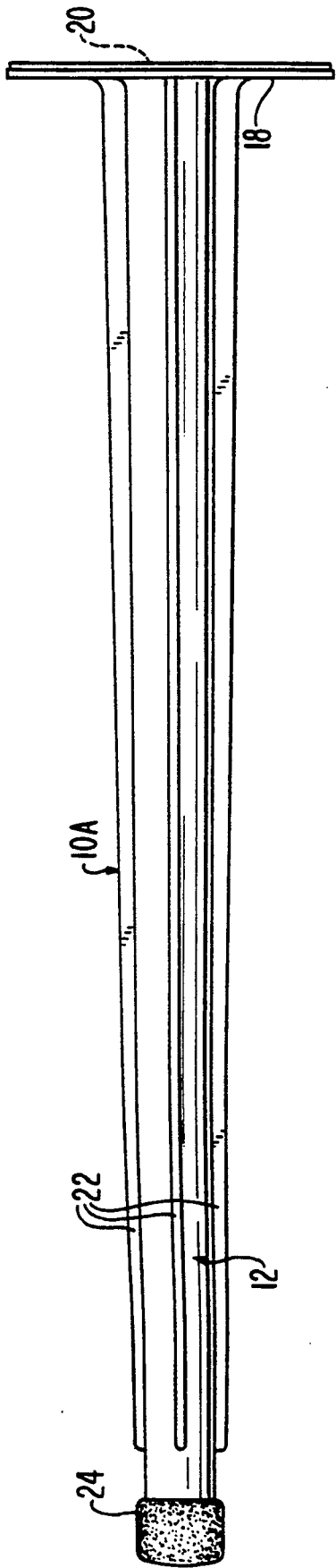
FIG. 2 is a side elevation view of a first unit forming part of the housing of the apparatus.
Figure 3:
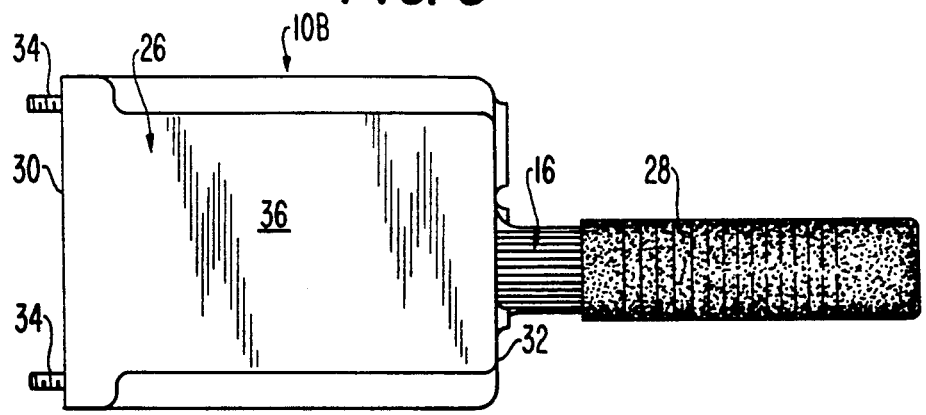
FIG. 3 is a side elevation view of a second unit forming part of the housing.
Figure 4:
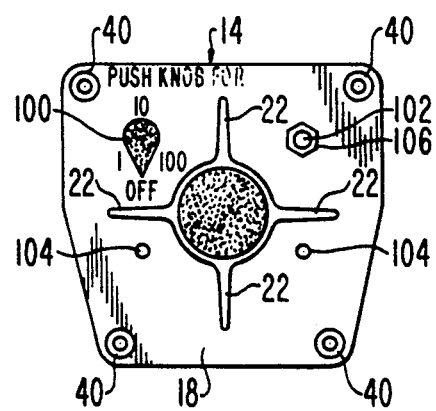
FIG. 4 is a left end view of the apparatus of FIG. 1.

As shown in FIGS. 1-3, in accordance with the invention, a housing 10 comprises a tube 12, a casing 14, and a tubular handle 16. The housing is formed in two parts 10A, 10B, each of which is an integral molded plastic unit. One part, 10A, shown in FIG. 2, includes the tube 12 with a stepped plate 18 at one end transverse to the length of the tube. The plate 18 constitutes an end wall of the casing 14 and has a central hole 20 therethrough. The tube 12 is reinforced by fins 22 (see FIGS. 2 and 4) and has a rubber crutch tip 24 at the end opposite to the plate. The other part, 10B, of the housing, shown in FIG. 3, includes a cup-shaped cover 26 of the casing 14, and the tubular handle 16, which may have a plastic or rubber grip 28. The cover is open at one end 30 and has an end wall 32 at the opposite end. The cover is attached to the plate 18 by four threaded studs 34 projecting from bosses of the side wall 36 at the open end. The studs extend through openings in the plate and receive nuts 40 thereon, as shown in FIG. 4.

FIG. 6 illustrates apparatus 42 that is received within the housing 10. As shown, this apparatus comprises a sensor assembly 43 that includes a pair of fluxgate magnetic sensors 44 mounted on a support 46, preferably an aluminum channel or angle structural member entirely open at one side. See channel 46A and angle 46B in FIGS. 7 and 8, respectively. The sensors may be preassembled with an excitation wire (not shown) to form a sub-assembly that is placed on the support 46 via the open side of the support. Each of the sensors is embraced by the walls of the support and is attached thereto by adhesive. Foam pads 48 are placed around each sensor, as shown in FIGS. 7 and 8, and tape 50 is wrapped around the foam pads and the support, as shown in FIG. 6, to assist in holding the sensors on the support. Unlike the pads of the presently marketed locator, the pads 48 do not partake in maintaining the longitudinal position of the sensor assembly in the housing. As stated earlier, the support 46 of the invention and the manner in which the sensors are installed on the support are simpler and less expensive compared to the locator presently marketed.

The apparatus of FIG. 6 also comprises an electrical unit 52 that includes an aluminum chassis 54. The chassis has a flange 56 at one end for attaching the chassis to the plate 18. A flat aluminum strip 58 has one end attached to the support and the opposite end attached to the chassis, by rivets 60. The sensor assembly is accordingly rigidly attached to the electrical unit 52 as a cantilever extending from the electrical unit, so that its position relative to the electrical unit cannot vary. Unlike the presently marketed locator, in the invention there is no reliance upon the stiff excitation wire to establish the position of the sensor assembly relative to the electrical unit, and the bail employed heretofore to maintain the position is not required. A battery carrier 62 is mounted on the chassis at one side thereof, and a printed circuit board 64 is mounted on the chassis at the opposite side, by standoffs 66. Batteries (not shown) supply electrical power to circuit components (not shown) cooperable with the magnetic sensors to detect magnetic objects. The circuit components and the manner in which they and the sensors operate to detect magnetic objects are well known and will not be described in detail. Succinctly stated, an oscillator provides AC excitation to magnetic cores of the sensors via the excitation wire to drive the cores into saturation on opposite half cycles of the excitation frequency. In the absence of a magnetic object to be detected, signal coils wound around the cores produce a balanced output. When a magnetic object is present, the output becomes unbalanced, and the detection of the object is indicated, acoustically, for example.

Figure 5:
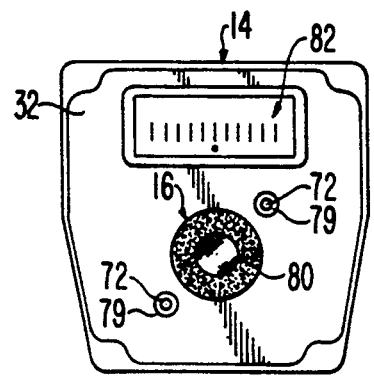
FIG. 5 is a right end view of the apparatus of FIG. 1.

To provide an acoustic indication, an electro-acoustic transducer, more particularly a loudspeaker 68, is mounted on oppositely directed flanges 70 of the chassis. The speaker is preferably mounted, as disclosed in U.S. Pat. No. 4,163,877, on a pair of threaded studs 72 that project from the flanges 70. The studs extend through corresponding holes in the frame 74 of the speaker, which is biased away from the flanges by coil springs 76 on the studs at one side of the frame. At the opposite side of the frame, O-rings 78 are placed on the threads of the studs. The studs extend through holes in the end wall 32 of the cover and receive nuts 79 thereon, as shown in FIG. 5. The inner surface of the end wall presses against the O-rings to compress the coil springs, so that the speaker is held against the end wall resiliently.

When the electrical unit 52 is housed within the casing 14, the speaker is aligned with an end of the hollow handle 16 open to the interior of the casing. The other end of the handle is covered by a sound-pervious water-resistant screen or shield 80 (FIG. 5). Sound from the speaker is transmitted by the hollow handle to the exterior of the apparatus. As shown in FIG. 6, the electrical unit preferably includes a center-zero meter 82 that is mounted on the printed circuit board 64 by means of an aluminum meter support plate 84 and standoffs 86. The indicating portion of the meter projects through an opening in the end wall 32 of the cover, as shown in FIG. 9, and is sealed thereto by a bezel and gasket assembly 90. See FIGS. 5, 6, and 9. A plastic magnet 91 may be mounted on board 64 to compensate for magnetic fields of the meter and the speaker.

As also shown in FIG. 6, an ON/OFF sensitivity control 92 is rigidly mounted on the printed circuit board by short stiff leads 94 that are soldered to the board. The shaft 96 of the control projects through an opening in the plate 18 and receives a knob 100, as shown in FIG. 4. A headphone jack 102 shown in FIG. 4 may also be rigidly mounted on the printed circuit board so as to project through a corresponding opening in the plate 18.

Assembly of the apparatus of the invention is quite simple, requiring little manual labor. The apparatus shown in FIG. 6 is assembled as described earlier. This apparatus is moved as a unitary structure relative to the part 10A of the housing shown in FIG. 21 so as to insert the sensor assembly 43 into the tube 12 through the hole 20 in the plate 18 and to juxtapose the flange 56 of the chassis with the plate. The shaft 96 of the control 92 and the headphone jack 102 enter the corresponding holes in the plate as the flange 56 approaches the plate. This is a simpler procedure than the assembly method for the presently marketed locator, in which the sensor assembly is inserted in the housing tube in an operation separate from the mounting of the electrical unit on the plate, after which the sensor assembly and the electrical unit must be connected mechanically and electrically. Moreover, in the invention, the mounting of the control 92 is simpler than in the presently marketed locator, in which the control is mounted on the plate and is connected to the printed circuit board by flexible leads.

The chassis 54 is secured to the plate 18 by screws 104 threaded into the flange 56 through corresponding holes in the plate. See FIG. 4. The knob 100 is then placed on the shaft of the control, and a hex-ring 106 is threaded onto the headphone jack. Then the cover 26 shown in FIG. 3 is moved longitudinally over the electrical unit 52 so as to seat the open end 30 of the cover on the plate 18. The mounting studs 34 enter corresponding holes in the plate and receive nuts 40, as described earlier. The meter 82 and the loudspeaker 68 are disposed relative to the end wall 32 of the cover and the handle 16, as also described earlier.

To use the apparatus, the handle is grasped manually, and the crutch tip end of the housing 10 is swept over the ground to locate buried magnetic objects, in the same manner as the locator presently marketed. Detection of magnetic objects is indicated by both the speaker 68 and the meter 82.

While preferred embodiments of the invention have been shown and described, it will be apparent to those skilled in the art that changes can be made in these embodiments without departing from the principles and spirit of the invention, the scope of which is defined in the appended claims.

The invention claimed is:

1. A method of manufacturing magnetic detection apparatus, comprising:
    providing a housing constituted by a first integral molded plastic unit and a second integral molded plastic unit, the first unit including a tube having a plate at one end thereof transverse to the length of the tube and provided with a hole therethrough, the second unit including a cover open at one end and having a handle at the opposite end;

providing a unitary assembly of a pair of spaced magnetic sensors mounted on a support, and an electrical unit to which said support is rigidly attached as a cantilever;

moving said unitary assembly relative to said first housing unit so as to insert said support and said sensors into said tube through said opening in said plate and so as to juxtapose said electrical unit with said plate;

attaching said electrical unit to said plate;

moving said second housing unit relative to said first housing unit so as to place said cover over said electrical unit and so as to close the open end of said cover with said plate; and fastening said cover to said plate.

2. A method in accordance with claim 1, wherein said support is formed as a channel or angle structural member entirely open at one side thereof and said magnetic sensors are placed on said structural member via said open side and are embraced by said structural member.

3. A method in accordance with claim 1, wherein said electrical unit is provided with a printed circuit board on which a control is rigidly mounted and wherein said plate is provided with an opening therethrough that is aligned with an operating member of said control when said electrical unit is attached to said plate.

* * * * *